3,090,806
PROCESS FOR THE MANUFACTURE OF N-CYCLO-
HEXYLSULFAMATES
Hachiro Yamaguchi and Akira Nakatsuchi, Urawa-shi, Japan, assignors to Nitto Chemical Industry Co., Ltd., Tokyo, Japan, a corporation of Japan, and Zaidan Hojin Nitto Rikagaku Kenkyusho, Urawa-shi, Japan, an incorporated body of Japan
No Drawing. Filed Dec. 8, 1959, Ser. No. 858,010
8 Claims. (Cl. 260—501)

This invention relates to a process for the manufacture of N-cyclohexylsulfamates, and more particularly it relates to a process for the manufacture of N-cyclohexylsulfamates which comprises heating a mixture of diammonium imidodisulfonate and cyclohexylamine at 70° to 200° C. and then treating the resulting product with an alkali or alkaline-earth metal hydroxide.

N-cyclohexylsulfamates of our invention are useful sweetening agents, sodium or calcium cyclohexylsulfamate, for instance, having a remarked sweet taste which is fifty times greater than that of ordinary cane sugar, and a high solubility in water.

In the production of N-cyclohexylsulfamates it is known that cyclohexylamine is N-sulfonated with a N-sulfonating agent which may be suitably chosen from the group consisting of:
  (1) Addition compounds of sulfur trioxide, i.e. pyridine-sulfur trioxide, tertiary amine-sulfur trioxide and dioxane-sulfur trioxide,
  (2) Chlorosulfonic acid and chlorosulfonates, and
  (3) Sulfamic acid and sulfamates.

When the product produced by the above method is ammonium N-cyclohexylsulfamate or cyclohexylammonium N-cyclohexylsulfamate, it may be converted into sodium or calcium N-cyclohexylsulfamate by treating with caustic alkali. In the above method, however, there are several disadvantages, such as expensiveness of the starting material used, poor yield resulting from the occurrence of undesirable side reactions, and the necessity of a large quantity of solvent to avoid too violent a reaction.

It is accordingly an object of the present invention to provide an economical and commercially feasible method of producing N-cyclohexylsulfamates. Other objects, features and advantages of the invention will be apparent from the description and claims which follow.

We have discovered that one mole of diammonium imidodisulfonate is reacted with four moles of cyclohexylamine by heating whereby cyclohexylammonium N-cyclohexylsulfamate is obtained. In the present invention, wherein diammonium imidodisulfonate which can be commercially produced as an intermediate in the production of sulfamic acid from sulfur trioxide and ammonia, may be used as starting material to be reacted with cyclohexylamine, the reactions proceed as follows:

$$NH(SO_3NH_4)_2 + 2C_6H_{11}NH_2 \rightarrow$$
$$NH(SO_3NH_3C_6H_{11})_2 + 2NH_3 \quad (1)$$
$$NH(SO_3NH_3C_6H_{11})_2 + 2C_6H_{11}NH_2 \rightarrow$$
$$2C_6H_{11}NHSO_3NH_3C_6H_{11} + NH_3 \quad (2)$$
$$C_6H_{11}NHSO_3NH_3C_6H_{11} + MOH \rightarrow$$
$$C_6H_{11}NHSO_3M + C_6H_{11}NH_2 + H_2O \quad (3)$$
(M: Alkali or alkaline-earth metal)

That is to say, it is presumed that at the first stage dicyclohexylammonium imidodisulfonate is formed, one mole of which is reacted with two moles of cyclohexylamine to form two moles of cyclohexylammonium N-cyclohexylsulfamate which is followed by treatment with an alkali or alkaline-earth metal hydroxide; and finally, two moles of cyclohexylammonium N-cyclohexylsulfamate can be obtained from one mole of diammonium imidodisulfonate and four moles of cyclohexylamine. In the formation reaction of Equations 1 and 2, three moles of ammonia are liberated and in the alkali treatment of Equation 3, two moles of cyclohexylamine are liberated. While in the previously known method described hereinabove N,N'-dicyclohexylsulfamide and Glauber's salt (sodium sulfate) usually are recovered as main by-product, these materials recovered as by-product of the invention may be in an amount of less than a few percent. If reaction conditions are unsuitably chosen in the invention, Glauber's salt (sodium sulfate) may be undesirably formed according to the apparent reactions:

$$2C_6H_{11}NHSO_3NH_3C_6H_{11} \rightarrow C_6H_{11}NHSO_2NHC_6H_{11}$$
$$+ (C_6H_{11}NH_3)_2SO_4 \quad (4)$$
$$(C_6H_{11}NH_3)_2SO_4 + 2NaOH \rightarrow$$
$$Na_2SO_4 + 2C_6H_{11}NH_2 + 2H_2O \quad (5)$$

The above side reactions are undesirable since they mean the loss of diammonium imidosulfonate and caustic alkali in such amount as corresponds to that of Glauber's salt formed, but such side reactions are not a problem since they proceed to no appreciable extent at ordinary conditions.

In order to carry out the invention, diammonium imidodisulfonate is added to an excessive amount of cyclohexylamine or to a mixture of a theoretical amount of cyclohexylamine and an inert solvent, for instance kerosene, to provide a total mixture which is charged in a reaction vessel equipped with a stirrer and a reflux condenser, and then heated. A high-boiling inert solvent other than kerosene, such as decahydronaphthalene, and so forth, may be similarly used, but kerosene is most preferable because of its moderate price. On heating up to 70° to 130° C., preferably about 80° C., the reaction of Equation 1 proceeds while ammonia gas is violently evolved. When heating is further continued, the internal temperature is gradually raised, and at about 170° C. liberation or evolution of ammonia gas is further accelerated. While the temperature within the reaction vessel is maintained at 165° to 185° C., preferably 170° to 175° C., the reaction of Equation 2 proceeds smoothly. Of course, it is also possible to maintain a temperature of 165° to 185° C., preferably about 170° C. from the beginning of the reaction. After substantially completing the evolution of ammonia gas, the temperature is raised to about 180° C. to effect the complete reaction, and then excessive cyclohexylamine or the inert solvent is removed from the reaction mixture to leave cyclohexylammonium N-cyclohexylsulfamate crystal, which is thereafter followed by the treatment with caustic soda or milk of lime in a conventional manner. If desired, it is possible to directly treat the reaction mixture proper rather than the cyclohexylammonium N-cyclohexylsulfamate with alkali or alkaline-earth metal hydroxide, whereby the procedure for the separation of the former compound can be advantageously eliminated. In carrying out the above reaction under pressure, starting materials are charged into an autoclave with a stirrer, and it is necessary to discharge ammonia gas at times to prevent an increase of internal pressure within the autoclave resulting from the generation of ammonia. Precaution should be taken since extremely high reaction temperatures or an unduly long reaction period tends to induce undesirable side reactions by which sodium sulfate is formed. If the temperature of the N-sulfonation reaction is higher than 200° C., decomposition takes place and the yield of cyclohexylammonium N-cyclohexylsulfamate considerably decreases.

While in the reaction mechanism presumably dicyclohexylammonium imidodisulfonate is formed in the first place and it is then reacted with cyclohexylamine to produce cyclohexylammonium N-cyclohexylsulfamate, in the practical operations of the cyclohexylammonium N- cyclohexylsulfamate may be directly produced by keeping a reaction temperature at about 170° to 175° C. Cyclohexylamine may be used in an amount of 7 to 8 moles per one mole of diammonium imidodisulfonate in the absence of an inert solvent, or in a theoretical amount in the presence of an inert solvent such as kerosene.

As indicated hereinbefore, diammonium imidodisulfonate which is used as a starting material of the invention can be commercially produced as an intermediate in the production of sulfamic acid from sulfur trioxide and ammonia. Also the process of the invention involves no such violent reaction as is present in the previously known processes, and thus the inventive process can be carried out in a simple manner, there being no difficulties in the recovery of the reaction product and the solvent. Thus N-cyclohexylsulfamates can be produced in a surprisingly good yield (more than 90% according to the process of the invention).

In N-sulfonation reaction of the invention, cyclohexylamine is N-sulfonated with diammonium imidodisulfonate. Hereupon we discovered that, though the N-sulfonation reaction proceeded rather slowly at the first stage in a heterogeneous state made up of solid diammonium imidodisulfonate suspended in liquid cyclohexylamine, it proceeded rapidly in a melted state of reactants and products once a certain amount of cyclohexylammonium N-cyclohexylsulfamate was produced in the heterogeneous reaction. Besides it became clear that the reaction proceeded remarkably if the reaction took place in a melted state of diammonium imidodisulfonate created by the preliminary addition of certain compounds to said diammonium imidodisulfonate. For the above promotors it is necessary to melt diammonium imidodisulfonate under the reaction conditions. The compounds listed below are examples which have a considerable effect.

Urea, thiourea and the N-cyclohexyl derivatives,
Guandine,
Sulfamide and the N-cyclohexyl derivatives,
Sulfamates, and N-cyclohexylsulfamates
Nitrilosulfonates, and
Formamide, acetamide and the N-cyclohexyl derivatives.

Among the above compounds, guanidine is available in the form of an inorganic acid salt, for example, carbonic acid or sulfuric acid. The salt, as it is, can be used in the reaction. The required amount of these compounds may vary within the range of 0.01% to about 20%, depending on the promoting activity. Because of the good activity and commercial availability, urea, sulfamide or ammonium sulfamate is most preferable. Because of this promoting action of these compounds, there is no need to use pure diammonium imidodisulfonate in this invention. It is preferable to use crude diammonium imidodisulfonate which is made directly from sulfur trioxide and ammonia. It contains a little ammonium sulfamate and ammonium sulfate and a trace of sulfamide.

The following examples will show how the invention may be carried out, but the invention is not to be construed as limited thereto.

*Example 1*

In a reactor with a reflux condenser and a stirrer, 211 gr. (1 mol.) of diammonium imidodisulfonate and 1000 gr. of kerosene were mixed by stirring. To the mixture 198 gr. (2 mol.) of cyclohexylamine were added, and then heated with stirring. On reaching the temperature at about 80° C., ammonia gas was evolved vigorously. Concurrent with the decrease of ammonia evolved, heating was strengthened. At a temperature of about 170° C., 198 gr. of cyclohexylamine were additionally added dropwise. The reaction temperature was kept at 170° to 175° C. for about three hours. After completing the evolution of ammonia, the temperature was raised once to 180° C., and then heating was discontinued. The reaction mixture was heated together with 900 gr. of a 10% sodium hydroxide aqueous solution to the boiling temperature. Thereafter, from the reaction mixture which consists of two separable layers, aqueous layer and kerosene layer, the latter was recovered and then washed with 1000 gr. of water. The washings were combined with the above aqueous layer, and then cyclohexylamine, liberated with caustic soda, was recovered by azeotropic distillation of the combined mixture. The residue was concentrated, cooled and then filtered thereby to separate crude crystal from the mother liquor, which thereafter was treated twice in the same manner as above. The crude crystal thus collected was dissolved in water once more. The resulting solution was treated with hydrochloric acid to neutralize residual caustic alkali, decolorized with active carbon, and filtered. The filtrate was concentrated until sodium N-cyclohexylsulfamate was crystallized out, which was then filtered and dried. Thus 374 gr. of anhydrous crystal of sodium N-cyclohexylsulfamate were obtained. The yield was 93% as calculated from the weight of diammonium imidodisulfonate.

*Example 2*

Two hundred and eleven grams of diammonium imidodisulfonate and 1000 gr. of kerosene were charged in a reactor equipped with a reflux condenser and a stirrer, and then heated, while stirring, up to 175° C. To the mixture 400 gr. of cyclohexylamine were added in such a manner as to maintain at a reaction temperature of 175° C. For the addition it took about four hours. At the end of this time the reaction was almost completed, and cyclohexylammonium N-cyclohexyl sulfamate crystal was crystallized out. To the reaction product, 800 gr. of milk of lime containing 10% of calcium hydroxide were added, and the mixture was heated up to boiling temperature. Thereafter from the mixture comprising two layers a kerosene layer was recovered and washed with water. The washings, combined together with the other aqueous solution layer, was concentrated to dryness, while cyclohexylamine which had been liberated with calcium hydroxide was separated by azeotropic distillation. The thus recovered crude product was added with 1500 gr. of water, and dissolved therein by warming. The resultant solution was neutralized with sulfuric acid, decolorized with active carbon, and then filtered. The filtrate was concentrated until the crystal was crystallized out. The crystal was separated from the mother liquor, which then was treated two times in the same manner. Thus 365 gr. of calcium N-cyclohexylsulfamate dihydrate were obtained. The yield was 84.5% as calculated from the weight of diammonium imidodisulfonate.

*Example 3*

To a reactor with a reflux condenser and a stirrer, 211 gr. of diammonium imidodisulfonate and 800 gr. of decahydronaphthalene were charged and heated up to 175° C. Then to the mixture 400 gr. of cyclohexylamine were added, and thereafter the mixture was treated in the same manner as in Example 1, whereby 362 gr. of sodium N-cyclohexylsulfamate anhydride crystal were obtained. Yield 90%.

*Example 4*

Twenty-one grams of diammonium imidodisulfonate and 80 gr. of cyclohexylamine were placed in a ca. 200 ml.-volume autoclave with a stirrer and then gradually heated while stirring up to an internal temperature of about 80° C. When the reaction proceeded, ammonia gas was liberated and accordingly the pressure within the vessel was increased. At the pressure of 20 kgr./cm.$^2$, ammonia gas was exhausted once. Then the reaction temperature was gradually raised up to 175° C. while ammonia gas generated was exhausted at times to keep an internal pressure of 8 to 10 kgr./cm.$^2$. When about 80% of theoretical amount of ammonia was exhausted, the temperature was raised up to 180° C. and thereafter heating was discontinued. After completing the reaction, an excessive amount of cyclohexylamine was recovered from the reaction mixture by distillation under a reduced pressure. To the total residue 100 gr. of a 10% sodium hydroxide aqueous solution were added, and the mixture was heated and then remained to cool. From the above mixture, the cyclohexylamine was recovered by azeotropic distillation. The residual liquor was cooled, until sodium N-cyclohexylsulfamate was crystallized out, which thereafter was filtered, recrystallized and then dried. Thus 37 gr. of sodium N-cyclohexylsulfamate anhydride crystal were obtained. Yield 92%.

*Example 5*

A mixture of 21 gr. of diammonium imidodisulfonate, 40 gr. of cyclohexylamine and 99 gr. of kerosene was charged into an autoclave with a stirrer. Then, by repeating the same manner as described in Example 4, 34 gr. of sodium N-cyclohexylsulfamate anhydride crystal were produced. Yield 85%.

*Example 6*

In a reactor equipped with a reflux condenser and a stirrer, a mixture of 222 gr. of crude diammonium imidodisulfonate (purity: 95%) and 1000 gr. of kerosene was charged and heated to 170° C. Then 400 gr. of cyclohexylamine were added to the mixture, maintaining the reaction temperature at 170 to 172° C. for about three hours. The product was treated in the same way as in Example 1, whereby 370 gr. of sodium N-cyclohexylsulfamate were obtained.

*Example 7*

In a reactor equipped with a reflux condenser and a stirrer, a mixture of 211 gr. of diammonium imidodisulfonate, 5 gr. of urea and 1000 gr. of kerosene was brought into reaction with 420 gr. of cyclohexylamine in the same manner as described in Example 2. As the result of the reaction for about one hour, 362 gr. of sodium N-cyclohexylsulfamate anhydride crystal were produced. Yield 90%.

*Example 8*

In place of 5 gr. of urea in Example 7, 10 gr. of urea were used. The reaction time was shortened to forty minutes.

*Example 9*

In place of urea in Example 7, 10 gr. of thiourea were used. The reaction was completed in one hour.

*Example 10*

In a reactor equipped with a reflux condenser and a stirrer, a mixture of 169 gr. of diammonium imidodisulfonate, 46 gr. of ammonium sulfamate and 1000 gr. of kerosene was charged and heated to 165° C. Then 400 gr. of cyclohexylamine were added to the mixture, maintaining the temperature at 165 to 166° C. The reaction was completed in two hours and a half.

*Example 11*

In the above reactor, a mixture of 211 gr. of diammonium imidodisulfonate, 2 gr. of sulfamide and 1000 gr. of kerosene was charged and heated to 175° C. Then 400 gr. of cyclohexylamine were added to the mixture, maintaining the temperature at 175° C. The reaction was completed in two hours.

*Example 12*

In place of sulfamide in Example 11, 10 gr. of N-cyclohexylsulfamide were used. The reaction was completed in two hours.

*Example 13*

In place of sulfamide in Example 11, 20 gr. of N,N'-dicyclohexylsulfamide were used. The reaction was completed in three hours.

*Example 14*

In place of sulfamide in Example 11, 20 gr. of cyclohexylammonium N-cyclohexylsulfamate were used. The reaction was completed in two hours.

*Examples 15–19*

N,N'-dicyclohexylurea, guanidine, ammonium nitrilosulfonate, formamide and acetamide also showed a promoting activity.

What we claim is:

1. A process for the manufacture of cyclohexylammonium N-cyclohexylsulfamate which comprises heating diammonium imidodisulfonate and cyclohexylamine at the temperature of 70° to 200° C.
2. A process as defined in claim 1, wherein diammonium imidodisulfonate is in crude form, produced from sulfur trioxide and ammonia.
3. A process for the manufacture of cyclohexylammonium N-cyclohexylsulfamate which comprises heating one mole of diammonium imidodisulfonate and six to ten moles of cyclohexylamine at the temperature of 165° to 185° C.
4. A process for the manufacture of cyclohexylammonium N-cyclohexylsulfamate which comprises heating diammonium imidodisulfonate and cyclohexylamine in kerosene at the temperature of 70° to 200° C.
5. A process for the manufacture of cyclohexylammonium N-cyclohexylsulfamate which comprises heating diammonium imidodisulfonate and cyclohexylamine in urea at the temperature of 70° to 200° C.
6. A process for the manufacture of cyclohexylammonium N-cyclohexylsulfamate which comprises heating diammonium imidodisulfonate and cyclohexylamine in guanidine at the temperature of 70° to 200° C.
7. A process for the manufacture of cyclohexylammonium N-cyclohexylsulfamate which comprises heating diammonium imidodisulfonate and cyclohexylamine in ammonium nitrilosulfonate at the temperature of 70° to 200° C.
8. A process for the manufacture of cyclohexylammonium N-cyclohexylsulfamate which comprises heating diammonium imidodisulfonate and cyclohexylamine in acetamide at a temperature of 70° to 200° C.

References Cited in the file of this patent

UNITED STATES PATENTS 2,814,640    Golding  ------------- Nov. 26, 1957

FOREIGN PATENTS 662,800    Great Britain ---------- Dec. 12, 1951

OTHER REFERENCES

Audrieth et al., Chemical Reviews, volume 26, pages 84–86 (1940).

Cupery et al., Ind. and Eng. Chem., volume 34, page 792 (1942).